2,736,791

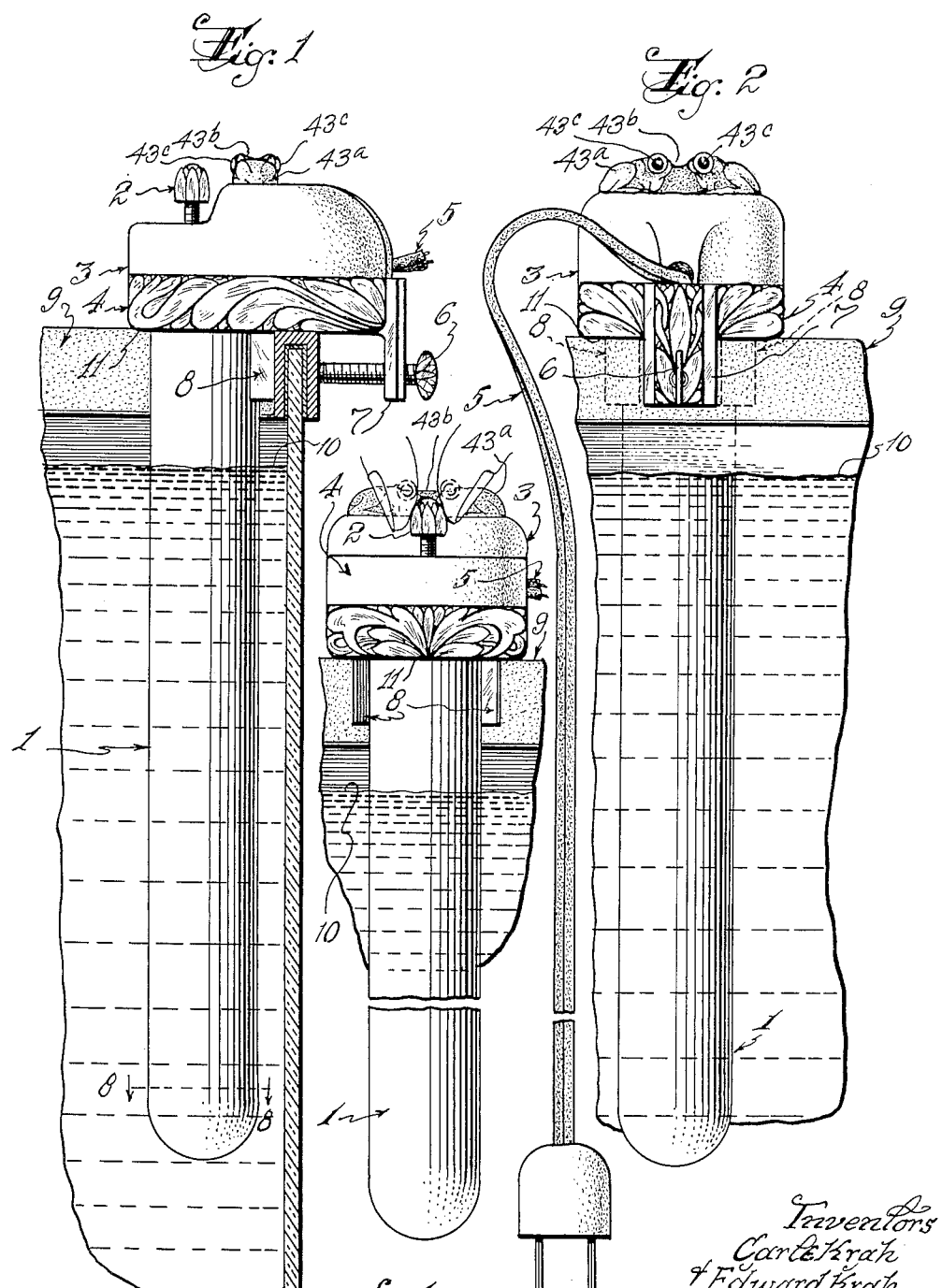

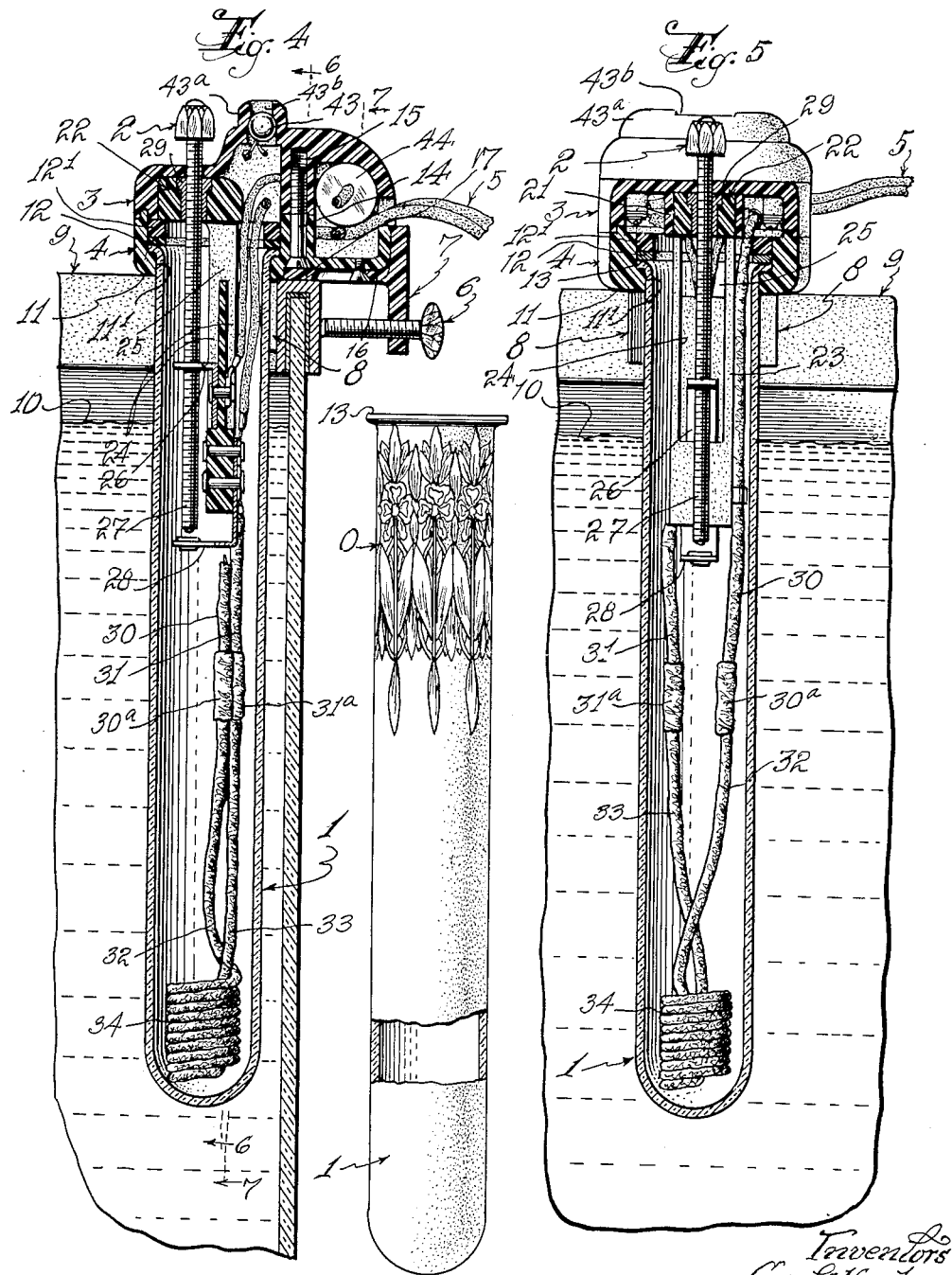

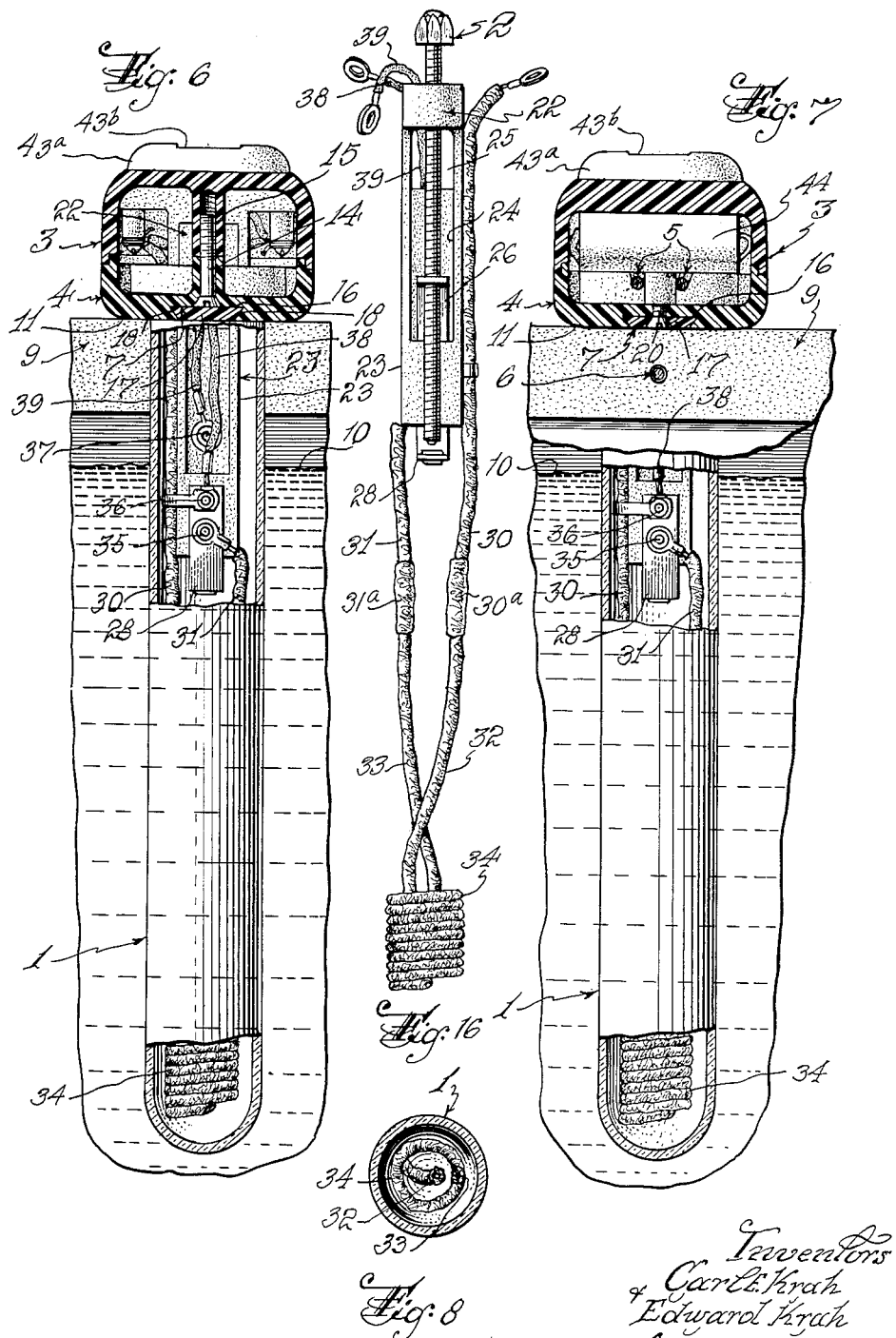

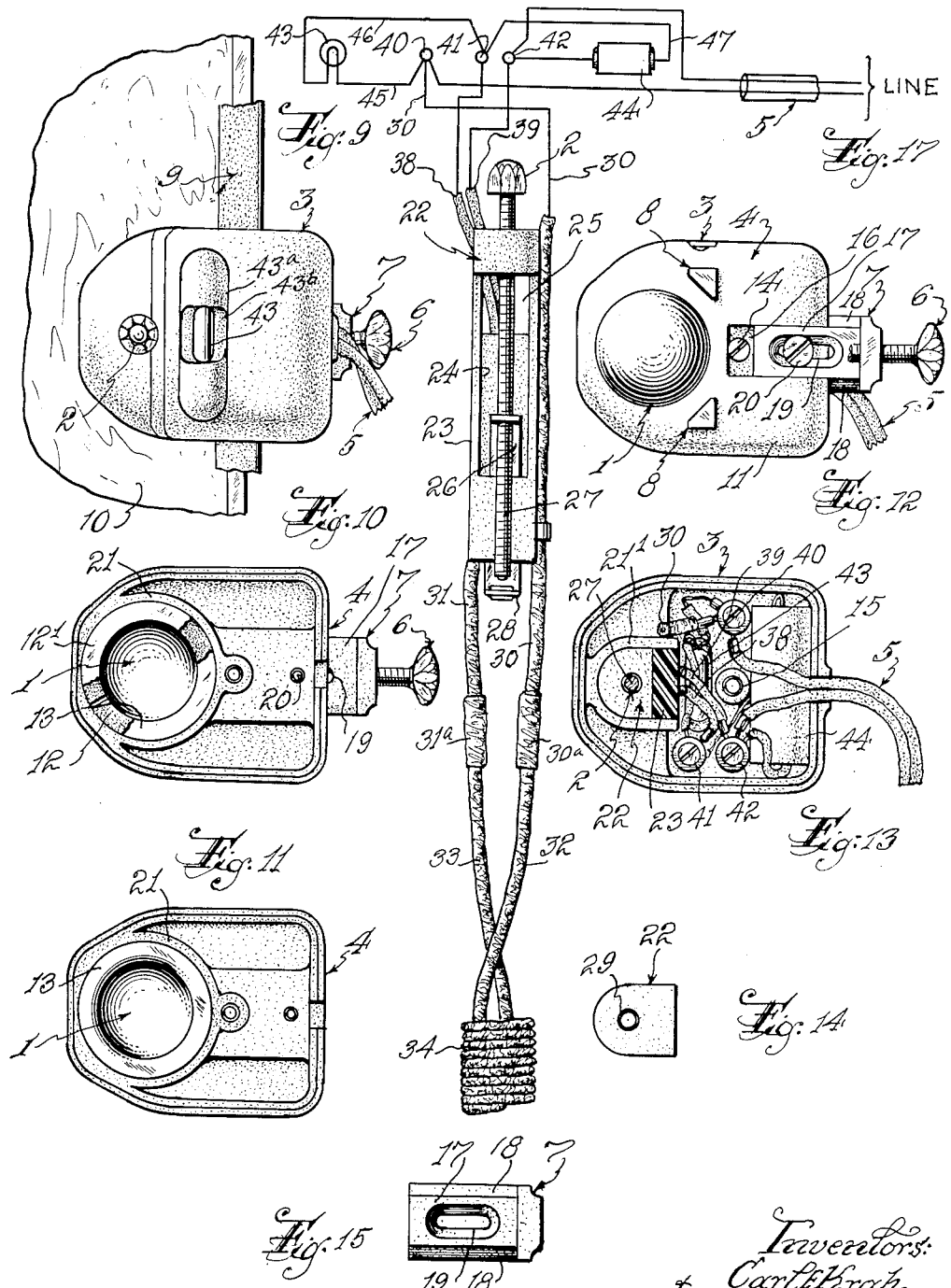

THERMOSTATICALLY CONTROLLED ELECTRIC WATER HEATER

Carl E. Krah and Edward Krah, Newark, N. J.

Application January 25, 1954, Serial No. 405,896

7 Claims. (Cl. 219—41)

This invention relates to a thermostatically controlled electric water heater adapted for use with aquariums or the like and it is an improvement upon the electric water heater disclosed and claimed in Patent No. 2,666,838, issued to Edward Krah, Carl Krah and Walter Rudy.

It is the object of this invention to provide in such an electric water heater a more compact and efficient thermostat switch together with a more suitable heating element. A further object is to provide an aquarium heater that may readily be removably adapted to aquariums of various wall thicknesses. A still further object is to provide an aquarium heater that will be compact in size, economical to make and easy to maintain and yet having its electrical system and heating element adequately protected from contact with the water in which the heater may be immersed.

Another object is to provide in such a heater better visual means for indicating whether or not current is passing through the heating element and improved means for adjusting the heater to make it responsive to any desired temperature.

Further objects will appear from the description which follows.

This invention is illustrated in the accompanying drawings in which:

Figure 1 is a side elevation of the heater mounted in operating position on the wall of an aquarium.

Figure 2 is the corresponding front elevation.

Figure 3 is the corresponding rear elevation.

Figure 4 is a central vertical section of the view of Figure 1 without the ornamental lamp cover.

Figure 5 is a central vertical section of the view of Figure 3 without the ornamental lamp cover.

Figure 6 is a view, partly in section, on 6—6 of Figure 4.

Figure 7 is a view, partly in section, on 7—7 of Figure 4.

Figure 8 is a cross section on 8—8 of Figure 1.

Figure 9 is a top view of the heater of Figure 1 without the ornamental lamp cover.

Figure 10 is a top view of the tube holder and tube with a portion of the tube spacing washer cut away.

Figure 11 is the view of Figure 10 without the washers and the aquarium wall clamping means.

Figure 12 is a bottom view of the heater.

Figure 13 is a cross section of the heater at the juncture of the cap and base.

Figure 14 is a top view of the switch mounting.

Fgure 15 is a bottom view of the clamping member.

Figure 16 is a rear elevation of only the thermostat and heating element.

Figure 17 is the same as Figure 16 with wiring diagram annexed.

Figure 18 is an elevational view, partly in section, of the tube only.

Referring to the figures in which the same identification number refers to the same or a similar part, a single embodiment of this invention is illustrated with but one modification, that of top ornamentation.

Figures 1, 2 and 3 illustrate the outward appearance of a complete heater mounted on the wall of an aquarium in position for use. Referring to such figures, heat resistant tube 1, projects through opening 11′ in bottom surface 11 of base 4, base 4 being covered by cap 3. Projecting upward and out of cap 3 is thermostat adjusting screw 2; extending out of cap 3 at one side is electric cord 5. The heater is removably secured to marginal edge 9 of the aquarium wall by means of fixed lugs 8 projecting downward from the bottom of base 4 and thumb screw 6 threaded through adjustable clamp 7, shown in its most inward position. While the heater parts may be given various attractive designs, the one illustrated in these three figures shows a lamp housing 43a in the shape of two frogs with a central top opening 43b together with openings 43c positioned to give the appearance of eyes.

The other external details are best shown in Figures 12 and 15 which illustrate the heater attaching means. Clamp 7 is T-shaped with leg 17 having beveled edges 18, slidable in groove 16 in base 4. Slot 19 centrally located in leg 17 permits clamp 7 to be secured in selected position by screw 20. Screw 14 (see also Figure 6) engaging in threaded hole 15 in cap 3, secures cap 3 to base 4. The head of screw 14 is flush with the bottom surface of groove 16, permitting leg 17 of clamp 7 to freely slide over it. When clamp 7 is at its innermost location, it completely conceals screw 14. Thumb screw 6 is threaded through one arm of clamp 7, parallel with leg 17.

Referring now to Figures 10 and 11, the contents of base 4 are best seen. Tube 1 is seated on rim 13 in opening 11′ in base 4. Upstanding wall 21 from the bottom of base 4 surrounds rim 13. Atop rim 13 are placed resilient sealing washer 12 and spacing washer 12′.

Supported within cap 3 and base 4 and extending downward into tube 1 is the thermostat and heating element, shown in Figures 16 and 17. The thermostat consists of a switch mounting with top 22, and body 23 on which the thermostat parts are mounted and the heating element 34 suspended. Body 23 has through it, opening 25 and on its front and rear surfaces, two shallow recesses 24 (see also Figure 4). Bracket 26, fixed in one recess 24, has a hole in its projecting arm in which shank 27 of adjusting screw 2 is threaded. Bracket 26 serves to support adjusting screw 2 (which passes freely through collar 29 (see Figures 4 and 5) in top 22), and it also provides electrical contact with it. Bi-metal switch arm 28 is mounted on body 23 to extend beyond the bottom thereof and to bring its contact end opposite the end of shank 27 of adjusting screw 2.

The lead wires 32 and 33 of heating element 34, which consists of a coil of insulated Nichrome resistance wire, are at splices 30a and 31a connected with wires 30 and 31 respectively. Wire 30 is mechanically held against body 23 by a clip extension of bi-metal switch arm 28. Wire 31 is electrically connected at terminal 35 to bi-metal switch arm 28. Wire 38 is connected with bi-metal switch arm 28 at terminal 36; wire 39 is connected with bracket 26 at terminal 37, the latter being in one recess 24 and integral with bracket 26 which projects from other recess 24. Terminals 35, 36 and 37 are shown best in Figure 6.

The cross-sectional view of cap 3 (Figure 13) and the other sectional views (Figures 4, 5, 6 and 7) reveal the cap construction and its contents. It contains lamp 43 and capacitor 44 and has a boss formed by U-shaped wall 21′ partially surrounding top 22 in friction fit engagement and adapted to bear on tube spacing washer 12′. Binding posts 40, 41 and 42 are provided for the electrical connections hereinafter described. Opening 43b in the top of cap 3 is opposite lamp 43 in raised lamp housing 43a. Threaded hole 15 accommodates screw 14 which holds cap 3 and base 4 together after the heater is completely assembled. Shank 27 of adjusting screw 2 passes unrestrained through collar 29 in top 22.

Referring to Figures 6 and 17 the wiring may be examined. Cord 5 enters cap 3 connecting an external source with binding posts 40 and 42. When current is called for, it flows from binding post 42 through wire 39 to terminal 37 on bracket 26, thence through shank 27, bi-metal switch arm 28 and thereafter in two paths; one through terminal 35 wire 31, wire 33, heating element 34, wire 32, wire 30 and then to binding post 40; the other through terminal 36, wire 38, binding post 41, wire 46, lamp 43, wire 45 and binding post 40.

The heater is assembled by inserting and connecting the lamp 43 and capacitor 44 within cap 3 and connecting cord 5. Next switch mounting body 23 with its appurtenances, less adjusting screw 2 is, by its top 22 friction fitted into cap 3 and the adjusting screw 2 put in place. The electrical connections are then completed. Base 4 with tube 1 and washers 12 and 12' in place is fitted to cap 3 and screw 14 used to bring, and hold, the cap and base together. With wall 21' bearing on spacing washer 12', tube 1 will be held rigidly in place. By adjusting clamp 7, and then use of thumb screw 6, the heater may be attached to the wall of an aquarium.

The operation of the heater requires that electric cord 5 be plugged into an appropriate electrical outlet, and by use of adjusting screw 2, contact made between shank 27 and bi-metal switch arm 28. This will cause the hereinbefore described circuits to be energized, lighting lamp 43 and causing heating element 34 to function. When the heat of the liquid in the tank reaches the desired temperature, which is determined by use of a thermometer, not shown in the drawings, and not a part of this invention, adjusting screw 2 is rotated, to raise it, to break contact, leaving a small air gap between shank 27 and bi-metal switch arm 28. Thereafter, a drop in the temperature of the liquid will cause bi-metal switch arm 28 to move sufficiently to close on shank 27 and again energize the circuits.

The sensitivity of the heater will depend upon the bi-metal switch arm and many acceptable kinds are commercially available. With raised lamp housing 43a and opening 43b, the light from lighted lamp 43 will be visible, not only from directly above, but from the sides. Use of translucent colored inserts in openings 43c, if the design illustrated is used, will also give evidence of a lighted lamp from the side.

Various materials, other than those described and illustrated, may be used and a number of modifications made in the construction of the heater without departing from the scope of this invention. We do not, therefore, by the embodiment herein illustrated, limit ourselves in such scope.

What we claim is:

1. A thermostatically controlled electric immersion heater comprising a shallow receptacle adapted to be removably secured to the side of an aquarium at right angle thereto; a tube open at one end, suspended by its open end through a hole in the bottom of the receptacle; a concave cover for the receptacle; a capacitor and a lamp in the cover with the lamp opposite a raised opening in the cover; an elongated switch mount friction fitted at its upper end within a boss on the inside of the cover and projecting downward within the tube; a flat ring and a sealing washer interposed between the periphery of the open end of the tube and the end of the said boss; a bi-metal switch arm fixed at one end to the switch mount with its other end free and bent at right angles inward of and below the switch mount; a bracket fixed to the switch mount; a threaded shaft mounted parallel with the mount through a threaded opening in the bracket with its lower end terminating in adjustable distance relationship with the free end of the bi-metal switch arm and its upper end terminating in a finger piece external of the heater; an electric resistance heater; and an electrical circuit including the electric resistance heater, lamp, capacitor, bi-metal switch arm, bracket and threaded shaft.

2. A thermostatically controlled electric immersion heater comprising a shallow receptacle; a fixed member depending from the bottom of the receptacle; a member slidably adjustable in the bottom of the receptacle depending therefrom parallel to the fixed member; a thumb screw passing through a threaded opening in the adjustable member at right angles to the fixed member; a tube open at one end, suspended by its open end through a hole in the bottom of the receptacle; a concave cover for the receptacle; a capacitor and a lamp in the cover with the lamp opposite a raised opening in the cover; an elongated switch mount friction fitted at its upper end within a boss on the inside of the cover and projecting downward within the tube; a flat ring and a sealing washer interposed between the periphery of the open end of the tube and the end of the said boss; a bi-metal switch arm fixed at one end to the switch mount with its other end free and bent at right angles inward of and below the switch mount; a bracket fixed to the switch mount; a threaded shaft mounted parallel with the mount and through a threaded opening in the bracket with its lower end terminating in adjustable distance relationship with the free end of the bi-metal switch arm and its upper end terminating in a finger piece external of the heater; an electric resistance heater; and an electrical circuit including the electric resistance heater, lamp, capacitor, bi-metal switch arm, bracket and threaded shaft.

3. In a thermostatically controlled electric immersion heater, a temperature responsive switch comprising an insulating rectangular switch mount within the heater; a bi-metal switch arm fixed at one end to a face of the mount with its other end free and bent at right angles inward of and below the mount; a conducting bracket fixed to the mount on the face back of the face supporting the bi-metal switch arm; and a conducting threaded shaft mounted parallel with the mount through a threaded opening in the bracket with its lower end terminating in adjustable distance relationship with the free end of the bi-metal switch arm and its upper end terminating in a finger piece external of the heater.

4. In an electric immersion heater having a body from which a tube contained electric resistance heater depends, aquarium wall adjustable clamping means comprising two opposing members depending from the body, one fixed thereto, the other slidable in the base of the body in adjustable spaced relationship to the fixed member; and a thumb screw passing through a threaded opening in the slidable member at right angles to the depending opposing members.

5. In an electric immersion heater having a body from which a tube contained electric resistance heater depends, aquarium wall adjustable clamping means comprising a fixed member depending from the body; an angle member with one leg slidable in the bottom of the body and its other leg in dependent relationship to the body and parallel to the said fixed member; a slot in the slidable leg of the angle member; a set screw passing through the slot in threaded engagement with the body; and a thumb screw passing through a threaded opening in the dependent leg of the angle at right angles thereto.

6. A thermostatically controlled electric immersion heater comprising a shallow receptable adapted to be removably secured to the side of an aquarium at right angle thereto; a tube open at one end, suspended by its open end through a hole in the bottom of the receptacle; a concave cover for the receptacle; a capacitor and a lamp in the cover with the lamp opposite a raised opening in the cover; an elongated switch mount friction fitted at its upper end within a boss on the inside of the cover and projecting downward within the tube; a bi-metal switch arm fixed at one end to the switch mount with its other end free and bent at right angles inward of and below the switch mount; a bracket fixed to the switch mount; a threaded shaft mounted parallel with the mount through a threaded opening in the bracket with its lower end terminating in adjustable distance relationship with the free end of the bi-metal switch arm and its upper end terminating in a finger piece external of the heater; an electric resistance heater; and an electrical circuit including the electric resistance heater, lamp, capacitor, bi-metal switch arm, bracket and threaded shaft.

7. A thermostatically controlled electric immersion heater comprising a shallow receptacle; a fixed member depending from the bottom of the receptacle; a member slidably adjustable in the bottom of the receptacle depending therefrom parallel to the fixed member; a thumb screw passing through a threaded opening in the adjustable member at right angles to the fixed member; a tube open at one end, suspended by its open end through a hole in the bottom of the receptacle; a concave cover for the receptacle; a capacitor and a lamp in the cover with the lamp opposite a raised opening in the cover; an elongated switch mount friction fitted at its upper end within a boss on the inside of the cover and projecting downward within the tube; a bi-metal switch arm fixed at one end to the switch mount with its other end free and bent at right angles inward of and below the switch mount; a bracket fixed to the switch mount; a threaded shaft mounted parallel with the mount and through a threaded opening in the bracket with its lower end terminating in adjustable distance relationship with the free end of the bi-metal switch arm and its upper end terminating in a finger piece external of the heater; an electric resistance heater; and an electrical circuit including the electric resistance heater, lamp, capacitor, bi-metal switch arm, bracket and threaded shaft.

References Cited in the file of this patent

UNITED STATES PATENTS

| | | |
|---|---|---|
| 2,128,807 | Ettinger | Aug. 30, 1938 |
| 2,477,363 | Danner | July 26, 1949 |
| 2,520,576 | Stookey | Aug. 29, 1950 |
| 2,576,688 | Landgraf | Nov. 27, 1951 |
| 2,666,838 | Krah et al. | Jan. 19, 1954 |